United States Patent
Iizuka

(10) Patent No.: US 12,350,975 B2
(45) Date of Patent: Jul. 8, 2025

(54) TIRE CASING LIFE MANAGEMENT SYSTEM AND TIRE CASING LIFE MANAGEMENT METHOD

(71) Applicant: The Yokohama Rubber Co., LTD., Tokyo (JP)

(72) Inventor: Hiroshi Iizuka, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 423 days.

(21) Appl. No.: 17/907,630

(22) PCT Filed: Apr. 1, 2021

(86) PCT No.: PCT/JP2021/014239
§ 371 (c)(1),
(2) Date: Sep. 28, 2022

(87) PCT Pub. No.: WO2021/201256
PCT Pub. Date: Oct. 7, 2021

(65) Prior Publication Data
US 2023/0130069 A1    Apr. 27, 2023

(30) Foreign Application Priority Data
Apr. 3, 2020   (JP) .................................. 2020-067781

(51) Int. Cl.
*B60C 19/00*   (2006.01)

(52) U.S. Cl.
CPC ........ *B60C 19/00* (2013.01); *B60C 2019/004* (2013.01)

(58) Field of Classification Search
CPC .......................... B60C 19/00; B60C 2019/004
See application file for complete search history.

(56) References Cited

U.S. PATENT DOCUMENTS 7,075,421 B1 * 7/2006 Tuttle ................. B60C 23/0498
340/447
2014/0067193 A1 * 3/2014 Gokyu .................... G07C 5/08
701/31.9

(Continued)

FOREIGN PATENT DOCUMENTS

| CN | 109311358 A | 2/2019 |
| CN | 111098644 A | 5/2020 |

(Continued)

*Primary Examiner* — Lisa M Caputo
*Assistant Examiner* — Nyla Gavia
(74) *Attorney, Agent, or Firm* — Thorpe North & Western

(57) ABSTRACT

Provided are a tire casing life management system and a tire casing life management method. A casing life management system includes a temperature sensor that measures the temperature of a tire, a heat history amount calculation unit that calculates a heat history amount received by the tire during a first period, on the basis of a plurality of pieces of temperature information of the tire measured during the first period of at least one day, an accumulation heat amount estimation unit that estimates an accumulation heat amount which can be received by the tire during the second period set for one year, on the basis of the heat history amount in the first period, and a casing life prediction unit that predicts the remaining life period of the casing from the accumulation heat amount in the second period and a predetermined threshold.

20 Claims, 9 Drawing Sheets

(56) References Cited

U.S. PATENT DOCUMENTS

| | | | |
|---|---|---|---|
| 2016/0167446 A1* | 6/2016 | Xu | B60C 23/0474 |
| | | | 702/34 |
| 2019/0160886 A1* | 5/2019 | Tamura | B60C 19/00 |
| 2019/0265129 A1 | 8/2019 | Tamura et al. | |

FOREIGN PATENT DOCUMENTS

| | | | | |
|---|---|---|---|---|
| EP | 3470244 A1 * | 4/2019 | | B60C 11/246 |
| JP | 2003-159918 A | 6/2003 | | |
| JP | 2008-298723 A | 12/2008 | | |
| JP | 2012-116417 A | 6/2012 | | |
| JP | 5347054 B1 | 11/2013 | | |
| JP | 2016-223857 A | 12/2016 | | |
| JP | 2017-218097 A | 12/2017 | | |
| JP | 2017-219477 A | 12/2017 | | |
| JP | 2018-147293 A | 9/2018 | | |
| WO | WO-2017082362 A1 * | 5/2017 | | B60C 11/24 |

* cited by examiner

TIRE CASING LIFE MANAGEMENT SYSTEM AND TIRE CASING LIFE MANAGEMENT METHOD

TECHNICAL FIELD

The present technology relates to a tire casing life management system and a tire casing life management method that manage the remaining life of a casing disposed on an inner side of tread rubber in a tire radial direction.

BACKGROUND ART

In the truck and bus industry of recent years, the use of a retread tire has been increasing from the viewpoint of reducing tire costs, which are a part of transportation costs, and the 3R concept (reduce, reuse, and recycle). Retread tires are tires that are reused by replacing the tread rubber of a used tire (particularly, a new tire that has reached the end of its primary life) with new tread rubber once the remaining groove amount is a predetermined value or less due to wear. Thus, new rubber is used for the tread rubber of the retread tire, but other parts (particularly, a casing including a carcass and a belt placed disposed on an inner side of the tread rubber in a tire radial direction) are continuously used for a long distance and for a long time after new running and retread running. Thus, it is important to manage the remaining life of the casing of the tire, and a technique for predicting the remaining life has been proposed (for example, see Japan Patent No. 5347054 B).

In general, the casing of the tire is degraded due to the amount of heat (temperature) applied to the tire, and a remaining life period is varied (shortened). In a configuration of the related art, there is a problem in that the configuration is complicated because the current physical property value of a case constitution member, which may be degraded due to air temperature in a tire, is estimated on the basis of physical property value information on estimated temperature history and in-tire air temperature of the case constituent member, temperature history and in-tire air temperature of the case constituent member pre-acquired by conducting a test and stored in a database, and the physical property value of at least one case constituent member. Furthermore, since a runnable distance is predicted as the remaining life of the case, it is difficult to accurately predict the remaining life (remaining life period), and, for example, it is difficult to make a plan for tire replacement or retreading.

SUMMARY

The present technology provides a tire casing life management system and a tire casing life management method, capable of easily predicting the remaining life period of a casing.

The present technology is a tire casing life management system for managing a remaining life of a casing disposed on an inner side of tread rubber in a tire radial direction and includes a temperature measurement unit that measures a temperature of a tire, a heat history amount calculation unit that calculates a heat history amount received by the tire during a predetermined first period on the basis of a plurality of pieces of temperature information of the tire measured during the first period, an accumulation heat amount estimation unit that estimates an accumulation heat amount received by the tire during a predetermined second period longer than the first period, on the basis of the heat history amount in the first period, and a casing life prediction unit that predicts the remaining life period of the casing from the accumulation heat amount in the second period and a predetermined threshold.

In the above-described tire casing life management system, preferably, the heat history amount calculation unit calculates the heat history amount by using a promotion coefficient related to a change in a state of a tire member given in advance with a temperature as a parameter and an accumulated time when the plurality of pieces of temperature information measured during the first period are divided into predetermined temperature intervals.

In the above-described tire casing life management system, preferably, the first period includes a traveling period in which a vehicle mounted with the tire is traveling and a non-traveling period in which the vehicle is stopped.

The above-described tire casing life management system includes a traveling state information acquisition unit that acquires traveling state information of the vehicle mounted with the tire, and preferably, the heat history amount calculation unit calculates the heat history amount in the first period by dividing the heat history amount into an in-traveling heat history amount when the vehicle is traveling and a non-in-traveling heat history amount when the vehicle is stopped.

In the casing life management system of the tire described above, the second period is set to one year or more, the tire casing life management system comprises a weather information acquisition unit that acquires past temperature information for a period corresponding to the second period, and preferably, the accumulation heat amount estimation unit estimates an accumulation heat amount according to a temperature change during the period.

The above-described tire casing life management system includes a position information acquisition unit that acquires position information of the tire when the temperature information is measured, or position information of the vehicle mounted with the tire, and preferably, the weather information acquisition unit acquires the temperature information of an area including the position information.

The above-described tire casing life management system includes an operating information acquisition unit that acquires operating information of the vehicle mounted with the tire during a period corresponding to the second period, and preferably, the accumulation heat amount estimation unit estimates the accumulation heat amount according to a change in an operating rate during the period.

In the casing life management system of the tire described above, preferably, the predetermined threshold is set to a value indicating durability of a belt or a carcass included in the casing.

Preferably, the above-described tire casing life management system includes an operation proposal unit that proposes an operation of the tire on the basis of the remaining life period.

Preferably, the above-described tire casing life management system includes a transmission unit that transmits the remaining life period to a predetermined user together with identification information of the tire, and a display unit that displays the transmitted information.

In the casing life management system of the tire described above, preferably, the accumulation heat amount estimation unit estimates an accumulation heat amount received by the tire during a predetermined third period set as a usage limit period of the tread rubber, on the basis of the heat history amount in the first period, and the tire casing life management system comprises a retreading possibility determination unit that determines whether retreading of the tire is possible from the accumulation heat amount in the third period and a predetermined retreading possibility determination threshold.

The above-described tire casing life management system includes an air pressure measurement unit that measures air pressure of the tire, and preferably, when a state of abnormal temperature or abnormal air pressure, in which the measured temperature information or air pressure information is outside of the specified range, is a predetermined time or more until the third period elapses, the retreading possibility determination unit determines that the retreading of the tire is not possible.

Furthermore, the present technology is a tire casing life management method for managing a remaining life of a casing disposed on an inner side of tread rubber in a tire radial direction, and includes the steps of measuring a temperature of a tire, calculating a heat history amount received by the tire during a predetermined first period on the basis of a plurality of pieces of temperature information of the tire measured during the first period, estimating an accumulation heat amount received by the tire during a predetermined second period longer than the first period, on the basis of the heat history amount in the first period, and predicting the remaining life period of the casing from the accumulation heat amount in the second period and a predetermined threshold.

The present technology includes a temperature measurement unit measuring a temperature of a tire, a heat history amount calculation unit calculating a heat history amount received by the tire during a predetermined first period on the basis of a plurality of pieces of temperature information of the tire measured during the first period, an accumulation heat amount estimation unit estimating an accumulation heat amount received by the tire during a predetermined second period longer than the first period, on the basis of the heat history amount in the first period, and a casing life prediction unit predicting a remaining life period of a casing from the accumulation heat amount in the second period and a predetermined threshold, which makes it possible to predict the remaining life period of the casing with a simple configuration.

DETAILED DESCRIPTION

Hereinafter, embodiments of a tire casing life management system according to the present technology will be described on the basis of the drawings. However, the present technology is not limited to the embodiment. Constituents of the following embodiments include elements that can be substituted and easily conceived of by a person skilled in the art or that are essentially identical.

A tire casing life management system (hereinafter, simply referred to as a casing life management system) according to the present embodiment manages the remaining life (lifetime) of a casing of a tire (pneumatic tire) having a tread rubber and the casing disposed on an inner side of the tread rubber in a tire radial direction. A tire to be managed includes not only a new tire but also, for example, a retread tire that is reused by replacing the tread rubber of a used tire (particularly, a new tire that has reached the end of is primary life) with new tread rubber once the remaining groove amount is a predetermined value or less due to wear. In a retread tire, new rubber is used for tread rubber, but a casing is continuously used for a long distance and for a long time after new running and retread running. Thus, it is important to manage the remaining life of the casing of the tire. The casing is a member disposed on an inner side of the tread rubber in the tire radial direction, and includes, for example, a carcass and a belt.

Figure 1:
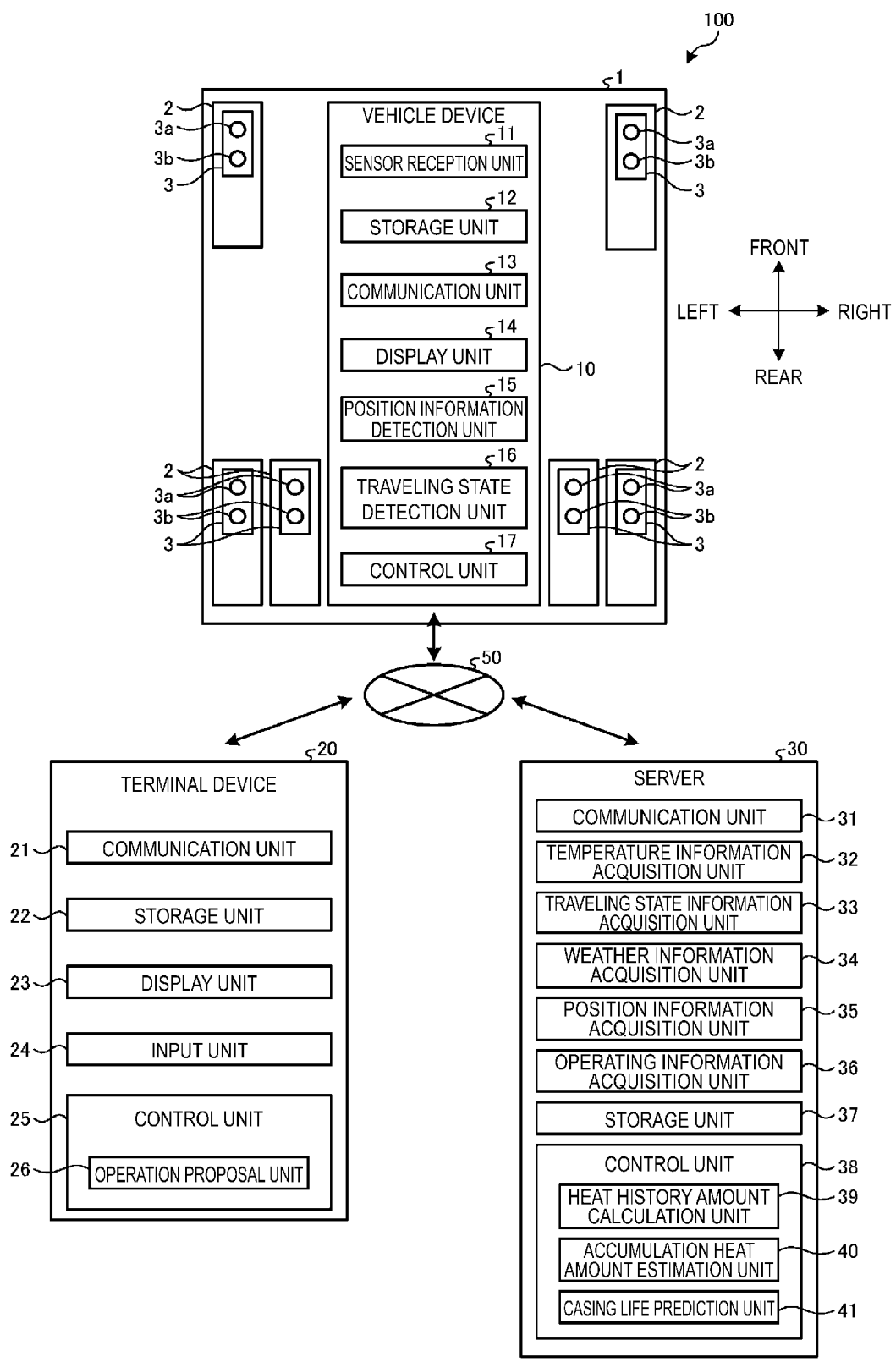
FIG. 1 is a block diagram illustrating an overall configuration of a tire casing life management system according to the present embodiment.

FIG. 1 is a block diagram illustrating an overall configuration of a casing life management system according to the present embodiment. As illustrated in FIG. 1, a casing life management system 100 includes sensors 3 respectively provided on tires 2 of a plurality of vehicles 1, vehicle devices (indicated as 'vehicle terminal 10' in the drawings) respectively provided on the plurality of vehicles 1, a terminal device 20, and a server (management device) 30.

The vehicle terminal 10, the terminal device 20, and the server 30 are communicably connected via a communication network 50 such as an Internet line. In the present embodiment, the vehicle 1 is a truck or a bus on which the above-described retread tire can be mounted as the tire 2, but is not limited thereto. In the example of FIG. 1, the vehicle 1 and the vehicle terminal 10 are illustrated one each, but a plurality of the vehicles 1 and a plurality of the vehicle terminal 10 are actually provided. Furthermore, at least one terminal device 20 can be provided.

The sensors 3 are tire pressure monitoring system (TPMS) sensors, and include a pneumatic sensor (air pressure measurement unit) 3a that measures the air pressure of the tire 2, and a temperature sensor (temperature measurement unit) 3b that measures the temperature of air in the tire 2. Furthermore, the sensor 3 may further include an acceleration sensor that measures a centrifugal acceleration acting on the tire 2. The sensor 3 is attached to, for example, an air valve of each tire 2 and is configured to be able to communicate with the vehicle terminal 10. A sensor ID (identification information) is set for each sensor 3, and the correspondence relationship among the sensor ID of the sensor 3, a tire ID (identification information) of the tire 2 including the sensor 3, and a wheel position on which the tire 2 is mounted (for example, in a truck or a bus, the left front wheel, right front wheel, left inner rear wheel, left outer rear wheel, right inner rear wheel, right outer rear wheel, or the like) is registered in the vehicle terminal 10. The measurement data of each sensor 3 can be transmitted to the vehicle terminal 10 every predetermined time by using, for example, short-range wireless communication such as radio frequency (RF) communication. Furthermore, in the present embodiment, it is assumed that the air temperature in the tire 2 measured by the temperature sensor 3b and the casing temperature are substantially identical to each other and the remaining life period of the casing is predicted from information on the temperature measured by the temperature sensor 3b.

The vehicle terminal 10 is mounted on the vehicle body of the vehicle 1. As illustrated in FIG. 1, the vehicle terminal 10 includes a sensor reception unit 11, a storage unit 12, a communication unit 13, a display unit 14, a position information detection unit 15, a traveling state information detection unit 16, and a control unit 17. The sensor reception unit 11 receives data transmitted from the sensors 3 of a plurality of (for example, six) tires 2. The storage unit 12 includes storage means such as a volatile or nonvolatile memory or an HDD (hard disk drive). The storage unit 12 stores various programs to be executed by the control unit 17 and various data. In the present embodiment, the storage unit 12 determines corresponding tire ID and wheel position from the sensor ID of the data received by the sensor reception unit 11 every predetermined time, and stores information on the air pressure and temperature of each tire 2 included in the received data as history information on tire air pressure and temperature at the corresponding wheel position. Furthermore, when the tire 2 is rotated in the vehicle 1, it is assumed that the correspondence relationship between the tire ID (sensor ID) registered in the vehicle terminal 10 and the wheel position is corrected.

The communication unit 13 is configured to be able to wirelessly communicate with the terminal device 20 and the server 30 via the communication network 50. The communication unit 13 transmits various information indicating the state of the vehicle 1 to the server 30 every predetermined time together with the vehicle ID of the vehicle 1. Specifically, the communication unit 13 transmits, to the server 30 and the terminal device 20, information on the air pressure and temperature of the tire 2 at each wheel position corresponding to the tire ID (sensor ID) and time information indicating the measurement time of each information on the air pressure and temperature in association with each other. In the present embodiment, the air pressure information is transmitted together with the temperature information of each the tire 2, but only the temperature information may be transmitted. Furthermore, the communication unit 13 transmits the traveling state information and the position information of the vehicle 1 to the server 30.

The display unit 14 is a display device including a display screen disposed on a dashboard or the like of the vehicle 1 and displaying various information to be provided to a user (driver). In the present embodiment, for example, the display unit 14 can display path guidance information including current position information of the vehicle 1 or current air pressure information and temperature information of each tire 2. Furthermore, when the remaining life period of the casing of the tire 2 is predicted, the display unit 14 can display information on the remaining life period.

The position information detection unit 15 is, for example, a global positioning system (GPS) sensor, and detects position information including latitude and longitude information of a current position where the vehicle 1 (tire 2) travels by receiving signals from a plurality of GPS satellites. The detected position information is stored in the storage unit 12 together with the time information and periodically transmitted to the server 30.

The traveling state information detection unit 16 detects traveling state information of the vehicle 1. The traveling state information is information indicating whether the vehicle 1 is in a traveling state. As the traveling state information detection unit 16, for example, a vehicle speed detection unit for detecting the vehicle speed of the vehicle 1, a driving source rotation number detection unit for detecting the number of rotations of a vehicle driving source such as an engine or a motor, and the like can be employed. Specifically, when a vehicle speed is a predetermined speed (for example, 1 km/h) or less or when an engine speed is a predetermined idling speed (for example, 1,000 rpm) or less, it is detected that the vehicle is in a non-traveling state (stopped state), and when the vehicle speed or the engine speed is larger than that value, it is detected that the vehicle is in a traveling state. Furthermore, the detection result of the position information detection unit 15 described above may be used to detect that the vehicle is in a non-traveling state (stopped state) when the position information of the vehicle 1 is not changed for a predetermined time (for example, 3 minutes). Furthermore, when the number of rotations of the vehicle driving source such as an engine or a motor is 0, that is, when the vehicle driving source is stopped, the traveling state information detection unit 16 may detect that the vehicle is in a non-traveling state (stopped state) due to the driving source stop state and distinguish the non-traveling state from a temporary stop during traveling (such as a stop due to a red signal). The detected traveling state information is stored in the storage unit 12 together with the time information and periodically transmitted to the server 30.

The control unit 17 includes, for example, a central processing unit (CPU), a read-only memory (ROM), a random-access memory (RAM), and the like, and controls the operation of the entire vehicle terminal 10 on the basis of a program stored in the storage unit 12. Specifically, the control unit 17 performs a process of periodically transmitting the information on the air pressure and temperature measured by the sensor 3, the current position information of the vehicle 1 detected by the position information detection unit 15, the traveling state information of the vehicle 1 detected by the traveling state information detection unit 16 to the server 30 and the terminal device 20 through the communication unit 13 together with the time information. Furthermore, the control unit 17 performs a predetermined process on the basis of information received from the outside of the vehicle terminal 10 and data stored in the storage unit 12.

The terminal device 20 is a device operated by a user (for example, a truck or bus carrier) that confirms the remaining life period of the casing, and can employ a personal computer, a tablet terminal, or the like. The user operating the terminal device 20 is not limited to the above-described carrier, and may be a retreader or a tire seller. As illustrated in FIG. 1, the terminal device 20 includes a communication unit 21, a storage unit 22, a display unit 23, an input unit 24, and a control unit 25. The communication unit 21 is configured to be able to wirelessly communicate with the vehicle terminal 10 and the server 30 via the communication network 50. The communication unit 21 receives the information on the air pressure and temperature of the tire 2 together with the tire ID of the tire 2 to be managed from the vehicle terminal 10. Furthermore, the communication unit 21 receives information on the remaining life period of the casing of the tire 2 to be managed from the server 30. Furthermore, when the user updates management information of the tire 2 (for example, maintenance information such as rotation or retread), the communication unit 21 transmits the management information to the server 30 together with the tire ID of the tire 2.

The storage unit 22 includes storage means such as a volatile or nonvolatile memory or an HDD. The storage unit 22 stores various programs to be executed by the control unit 25. Furthermore, the storage unit 22 stores the information on the air pressure and temperature of the tire 2, the management information, and the information on the remaining life period of the casing in association with the tire ID.

The display unit 23 is a display screen that displays various information to be provided to the user. The display unit 23 displays the information on the remaining life period of the casing of the tire 2 to be managed on the basis of an operation of the user, or displays proposal information on the operation of the tire 2 (for example, rotation or retread) on the basis of the remaining life period.

The input unit 24 is, for example, information input means such as a keyboard or a mouse, and inputs various information to the terminal device 20. Furthermore, the input unit 24 may be a touch panel formed to be superimposed on the display unit 23. The control unit 25 includes a CPU, a ROM, a RAM, and the like, and controls the operation of the entire terminal device 20 on the basis of the information received from the vehicle terminal 10 and the server 30 via the communication unit 21, or the program stored in the storage unit 22. The control unit 25 has a function of operating as an operation proposal unit 26. The operation proposal unit 26 generates an operation plan of the tire 2 on the basis of the remaining life period of the casing of the tire 2 received from the server 30. For example, when the remaining groove amount of the tread rubber and the remaining life period of the casing are both sufficient and when the travel distance of the tire 2 has reached a predetermined distance, the operation proposal unit 26 generates an operation plan for rotating the tire 2 and proposes the operation plan to the user. Furthermore, when the remaining life period of the casing is sufficient, but the remaining groove amount of the tread rubber is a predetermined value or less, the operation proposal unit 26 generates an operation plan for acquiring a retread tire by executing a retread that renews the tread rubber, and proposes the operation plan to the user. Note that the above-described operation plan is an example and is not limited thereto. Furthermore, the operation plan may not be generated or proposed by the operation proposal unit 26, and may be generated by the user on the basis of the remaining life period of the casing.

The server 30 collects and stores the temperature information of the tire 2 transmitted from each vehicle terminal 10, and predicts the remaining life period of the casing of the tire 2 by using the collected temperature information. Furthermore, the server 30 transmits information on the predicted remaining life period to the vehicle terminal 10 of the vehicle 1 mounted with the target tire 2 and the terminal device 20. The server 30 includes, for example, a computer or the like installed in a cloud. As illustrated in FIG. 1, the server 30 includes a communication unit (transmission unit) 31, a temperature information acquisition unit 32, a traveling state information acquisition unit 33, a weather information acquisition unit 34, a position information acquisition unit 35, an operating information acquisition unit 36, a storage unit 37, and a control unit 38. Furthermore, the control unit 38 has a function of operating as a heat history amount calculation unit 39, an accumulation heat amount estimation unit 40, and a casing life prediction unit 41.

The communication unit 31 is configured to be able to wirelessly communicate with the vehicle terminal 10 and the terminal device 20 via the communication network 50. The communication unit 31 transmits information on the predicted remaining life period of the casing of the tire 2 to the vehicle terminal 10 of the vehicle 1 mounted with the tire 2 and the terminal device 20, respectively. Furthermore, the communication unit 31 receives various information transmitted from the vehicle terminal 10 and the terminal device 20.

The temperature information acquisition unit 32 acquires the temperature information of the tire 2 of each vehicle 1 received via the communication unit 31. The temperature information includes the vehicle ID of the vehicle 1, the tire ID (sensor ID) of each tire 2, the correspondence between the tire ID and the wheel position, and the time information indicating the measurement time of the temperature information. Furthermore, the temperature information acquisition unit 32 may acquire the air pressure information of the tire 2 of each vehicle 1 received via the communication unit 31, together with the temperature information.

The traveling state information acquisition unit 33 acquires the traveling state information of each vehicle 1 received via the communication unit 31. The traveling state information is information on whether the vehicle 1 is in a traveling state or a stopped state (non-traveling state), and information on a traveling period in which the vehicle 1 is traveling and a non-traveling period in which the vehicle 1 is stopped can be acquired from time information when the above information is detected.

The weather information acquisition unit 34 accesses a predetermined site on the Internet through the communication network 50 and acquires desired weather information. Specifically, the weather information is weather information including temperature information of a predetermined period (for example, one year) in a specific area (for example, Kanagawa Prefecture) where the target vehicle 1 mainly travels. The temperature information may be temperature information for the latest year, but is preferably average annual temperature information in the past (for example, 30 years). Furthermore, a target area or period can be changed as appropriate. The weather information may be acquired by an operator, or may be acquired by the control unit 38 that executes a preset program.

The position information acquisition unit 35 acquires the position information of each vehicle 1 received via the communication unit 31. The acquired position information can be used in setting an area when the weather information acquisition unit 34 acquires weather information.

The operating information acquisition unit 36 acquires operation information of the vehicle 1. The operating information can be acquired from, for example, another management server or the like through the communication network 50. The operating information indicates a busy period or a slack period of the target vehicle 1, and includes monthly operating rate information for one year. The monthly operating rate information indicates how many hours the vehicle 1 is operating (traveling) in one month, and for example, when the vehicle 1 operates 27 days in 30 days (one month) and operates for 10 hours per day, the operating rate of the vehicle 1 is 37.5% ((27×10)/(30×24)×100=37.5%). The time during which the vehicle 1 is operating can be determined by measuring the time during which the engine is operating. The operating rate may be calculated by using another method, or may indicate how many days the vehicle 1 is operating (traveling) in one month. Furthermore, for example, in a vehicle such as a truck, average operating information of a plurality of vehicles with a vehicle body of the same type (size and the like) operating in the same area may be acquired.

The storage unit 37 stores the above-described acquired various information. Specifically, the storage unit 37 forms a database for storing various information for each vehicle 1, and stores in time series the air pressure and temperature information, the traveling state information, the position information, and the operating information corresponding to the vehicle 1. Furthermore, the storage unit 37 stores weather information including temperature information of a predetermined period (for example, one year) in a specific area acquired as necessary. Furthermore, the storage unit 37 stores information on an integrated heat history amount received by the tire 2 for each tire 2 of the vehicle 1. The integrated heat history amount is calculated periodically or in realtime on the basis of the acquired temperature information of each tire 2, and is updated as needed.

The control unit 38 includes a CPU, a ROM, a RAM, and the like, and controls the operation of the entire server 30 on the basis of information received from the vehicle terminal 10, an external device, or the like, or a program stored in the storage unit 37. In the present embodiment, when a process of predicting the remaining life period of the casing of the tire 2 is instructed, the control unit 38 functions as the heat history amount calculation unit 39, the accumulation heat amount estimation unit 40, and the casing life prediction unit 41 described above.

The heat history amount calculation unit 39 calculates the above-described integrated heat history amount periodically or realtime on the basis of the acquired temperature information of each tire 2. Separately from this, the heat history amount calculation unit 39 reads, from the storage unit 37, a plurality of pieces of temperature information of the tire 2 measured during a predetermined first period (for example, one month), and calculates a heat history amount received by the tire 2 during the first period on the basis of the temperature information. The first period can be set to a period of at least one day, but is preferably set to about one month in order to improve the prediction accuracy of the remaining life period. When the terminal device 20 instructs the process of predicting the remaining life period of the casing of the tire 2 of the target vehicle 1, the heat history amount calculation unit 39 reads, from the storage unit 37, a plurality of pieces of temperature information of the target tire 2 measured for the latest one month of the instruction, and calculates a heat history amount received by the tire 2 for one month on the basis of the temperature information.

The remaining life period of the casing of the tire 2 is greatly related to the amount of heat received by the tire 2, and the remaining life period is shorter as the integrated heat amount increases. The tire 2 is not only heated by internal heat generation or the like due to deformation caused by tire rolling while the vehicle 1 is traveling, but also receives heat due to the temperature of the sunlight and a surrounding environment even when the vehicle 1 is stopped (during non-traveling). Thus, the amount of heat received in the state where the vehicle 1 is stopped is preferably considered.

In the present embodiment, the first period includes a traveling period in which the vehicle 1 mounted with the tire 2 is traveling and a non-traveling period in which the vehicle 1 is stopped. Thus, the amount of heat received by the tire 2 during the non-traveling period in which the vehicle 1 is stopped can be considered, and the remaining life period of the casing can be accurately estimated. Specifically, according to the detection result of the traveling state information detection unit 16, the heat history amount calculation unit 39 calculates the heat history amount in the first period by dividing it into an in-traveling heat history amount when the vehicle 1 is traveling and a non-in-traveling heat history amount when the vehicle 1 is stopped. The non-in-traveling heat history amount is, for example, a heat history amount received by the tire 2 when the engine (driving source) of the vehicle 1 is stopped. As long as the temperature information of the tire 2 during the engine stop can be stored in the storage unit 12, the stored temperature information can be used as is, but it is also assumed that the temperature information of the tire 2 is not stored in the storage unit 12 due to the stopping of the vehicle terminal 10 during the engine stop. In this case, for example, a heat history amount (non-in-traveling heat history amount) can be calculated using a predetermined value as temperature information during the stopping. Furthermore, the outside air temperature corresponding to the date and time during the engine stop in an area where the vehicle 1 is stopped can be acquired by the weather information acquisition unit 34, and the heat history amount (non-in-traveling heat history amount) can also be calculated using the outside air temperature as the temperature information during the stopping.

According to the above configurations, it is possible to accurately calculate the heat history amount in the first period by dividing it into the in-traveling heat history amount when the vehicle 1 is traveling and the non-in-traveling heat history amount when the vehicle 1 is stopped, which makes it possible to accurately estimate the remaining life period of the casing. Moreover, it is possible to ascertain a heat history amount received by the tire 2 on a holiday when the vehicle 1 is not operated, which makes it possible to more accurately estimate the remaining life period of the casing.

The accumulation heat amount estimation unit 40 estimates an accumulation heat amount which can be received by the tire 2 during a predetermined second period, on the basis of the heat history amount in the first period. The second period is set to a longer period than the first period, and is one year in the present embodiment. On the basis of the heat history amount in the first period, the accumulation heat amount estimation unit 40 can easily estimate an accumulation heat amount for one year by multiplying a daily heat history amount by 365 or a monthly heat history amount by 12.

On the other hand, since it is common for a country, including Japan, to have a plurality of seasons that change in a yearly cycle, when estimating an accumulation heat amount for one year, a change in temperature with the season, a change in the operating rate of the vehicle 1, and the like are preferably considered. In the present embodiment, the accumulation heat amount estimation unit 40 uses a heat history amount for one month as a reference, and estimates the accumulation heat amount for one year in consideration of a temperature change in each month for one year, a change in the operating rate of the vehicle 1, and the like in the reference heat history amount. This makes it possible to accurately estimate the accumulation heat amount for one year, and to more accurately predict the remaining life period of the casing.

The casing life prediction unit 41 predicts the remaining life period of the casing from the estimated accumulation heat amount for one year and a predetermined threshold. In this case, the casing life prediction unit 41 predicts how much (how many years) the estimated accumulation heat amount for one year is added to an integrated heat history amount at the time when the process of predicting the remaining life period of the casing is instructed and thus the integrated heat history amount exceeds the predetermined threshold. The threshold is set to a value indicating the durability of the belt or carcass included in the casing. The durability is set as a residual physical property by using a belt peeling force, a breaking elongation of a belt rubber, a carcass cord pulling force, a breaking elongation of a carcass rubber or an adjacent part, and the like. This makes it possible to prevent a belt separation failure and a carcass separation failure as a tire failure in the market. Of course, the above-described threshold is set to a smaller value among values indicating the durability of the belt or carcass included in the casing.

Figure 2:
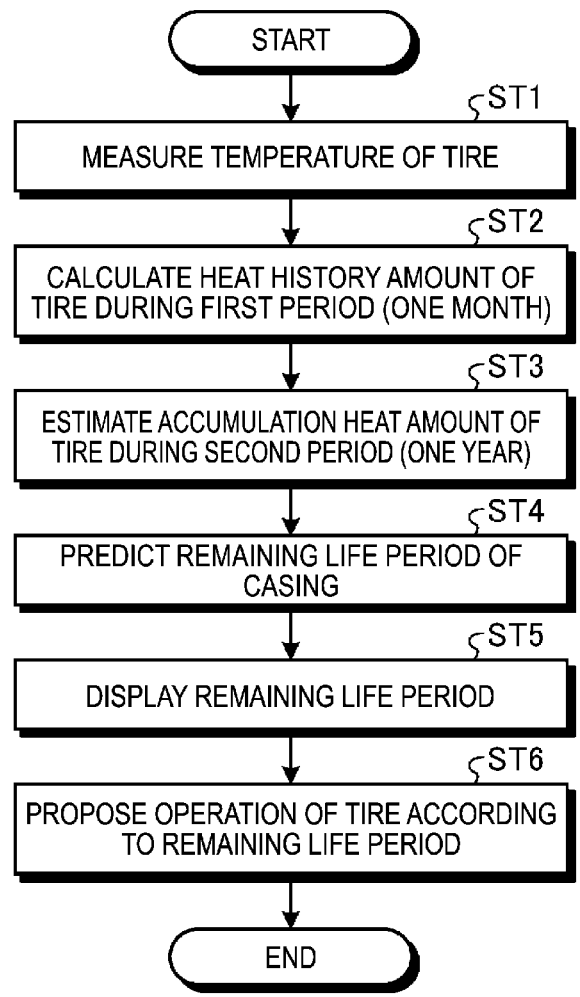
FIG. 2 is a flowchart illustrating an operation procedure of the casing life management system.
Figure 3:
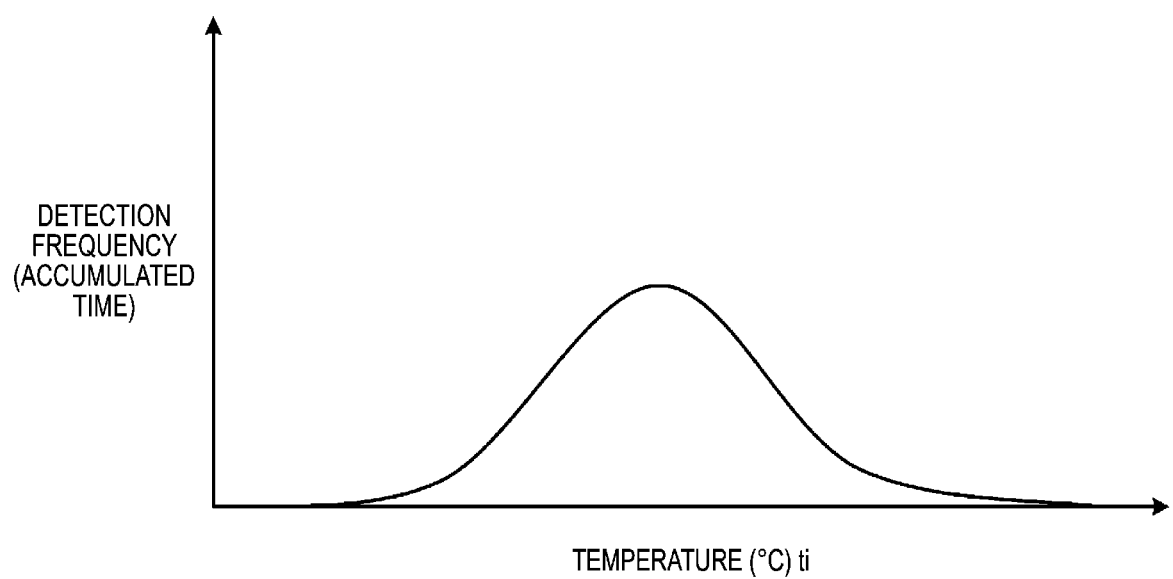
FIG. 3 is a diagram illustrating a relationship between a temperature detected during a first period and detection frequency.
Figure 4:
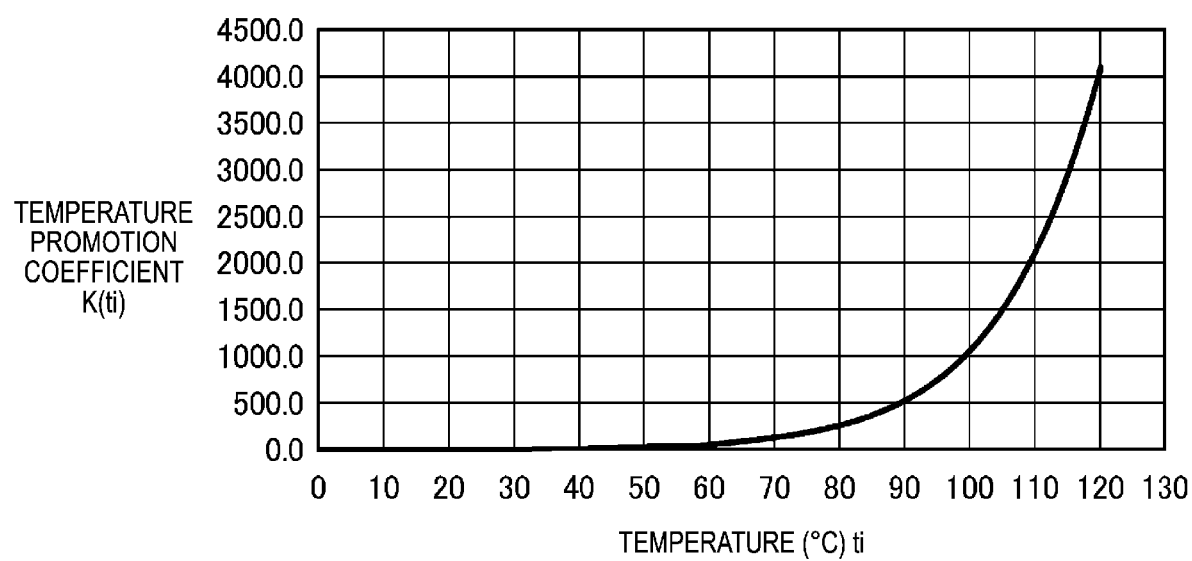
FIG. 4 is a diagram illustrating a relationship between a temperature promotion coefficient and a temperature.
Figure 5:
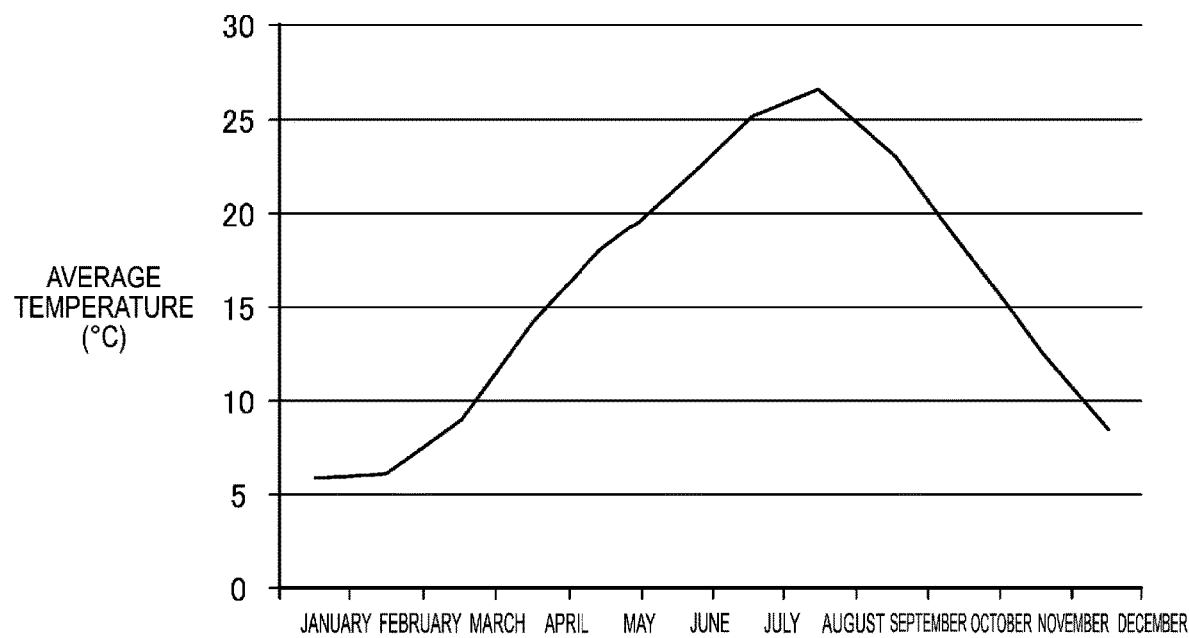
FIG. 5 is a diagram illustrating an average annual temperature change in a predetermined area where a vehicle travels.
Figure 6:
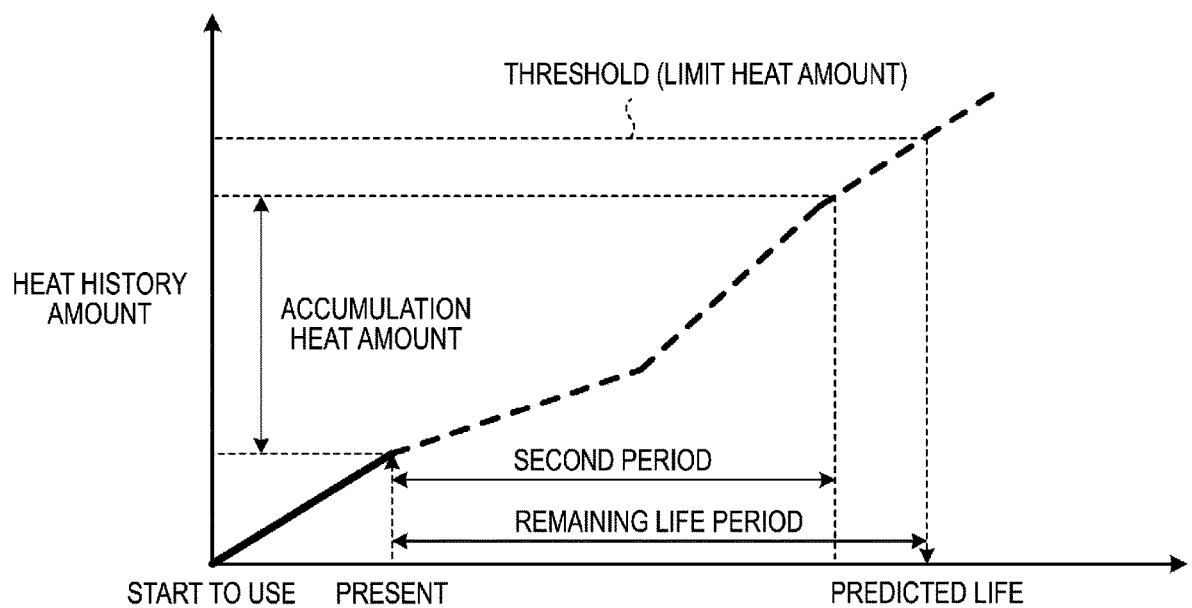
FIG. 6 is a diagram illustrating a relationship between a heat history amount of a tire and a predicted life.

Next, the operation of the casing life management system will be described. FIG. 2 is a flowchart illustrating an operating procedure of the casing life management system. FIG. 3 is a diagram illustrating a relationship between a temperature detected during the first period and detection frequency. FIG. 4 is a diagram illustrating a relationship between a temperature promotion coefficient and a temperature. FIG. 5 is a diagram illustrating an average annual temperature change in a predetermined area where the vehicle travels. FIG. 6 is a diagram illustrating a relationship between a heat history amount of a tire and a predicted life.

The sensors 3 provided on the tires 2 of the plurality of vehicles 1 measure the temperature inside the tires 2 every predetermined time (for example, 10 minutes) (step ST1). The measured temperature information is transmitted to the vehicle terminal 10 of the vehicle 1, and is stored in the storage unit 12 of the vehicle terminal 10. In this case, the vehicle terminal 10 receives the temperature information transmitted from the six sensors 3, and stores the received temperature information in the storage unit 12 as history information in which the temperature information and time information are associated, for each tire 2 identified by the sensor ID. Furthermore, the position information detection unit 15 and the traveling state information detection unit 16 of the vehicle terminal 10 detect position information and traveling state information of the vehicle 1. The detected position information and traveling state information of the vehicle 1 are stored in the storage unit 12 in association with the time information for each tire 2. The temperature information, time information, position information, and traveling state information of each tire 2 stored in the storage unit 12 are transmitted periodically (for example, once a day) to the server 30, and stored in the storage unit 37 of the server 30 for each tire 2 of each vehicle 1.

Next, the heat history amount calculation unit 39 of the server 30 calculates the heat history amount of the tire 2 during the predetermined first period (step ST2). Specifically, when the process of predicting the remaining life period of the casing of the tire 2 is instructed, the heat history amount calculation unit 39 calculates the heat history amount of the tire 2 for one month on the basis of the temperature information of the tire 2 for the latest one month corresponding to the first period from the storage unit 37. The heat history amount calculation unit 39 calculates the heat history amounts of all the six tires 2, but for convenience of explanation, one tire 2 will be described.

The heat history amount is also referred to as a total temperature severity number (TTSN), is an index indicating the total amount of heat received by the tire 2 during the entire usage period from the time of being a new product to the present, and the larger the heat history amount, the more the oxidative degradation of the tire 2 tends to progress. This is due to an increase in an air permeation coefficient of a rubber member included in the tire 2 when the temperature of the tire 2 increases. Furthermore, the temperature of the tire 2 varies greatly depending on. particularly, the heat generation of the tire itself when the vehicle 1 is traveling and the air temperature when the vehicle 1 is traveling.

First, the temperature information of the tire 2 for the latest one month (first period) acquired from the storage unit 37 is classified into temperature intervals of 1° C. between 0° C. and 120° C., and as illustrated in FIG. 3, the detection frequency of a measurement value in each temperature interval is acquired. The detection frequency indicates an accumulated time when the temperature information measured during the first period is divided into each temperature interval. In general, the temperature of the tire 2 tends to be low in the outer rear wheels of the vehicle and tends to be high in the inner rear wheels. Thus, the detection frequency (accumulated time) is preferably acquired according to the wheel position on which the tire 2 is mounted.

The heat history amount in the first time period is calculated by the following mathematical formula (1) by using a temperature promotion coefficient (promotion coefficient) related to a change in the state of a tire member given in advance with temperature as a parameter and the detection frequency (accumulated time) when the plurality of pieces of temperature information measured during the first period are divided into the predetermined temperature intervals.

$$\text{Heat history amount in first period}=\Sigma(K(ti)\times T(ti)) \quad (1)$$

In mathematical formula (1) above, the heat history amount in the first period is the sum of the section heat amounts over the above-described all temperature intervals. Furthermore, ti is temperature, and K(ti) is a temperature promotion coefficient at the temperature ti. Furthermore, T(ti) is an accumulated time at the temperature ti. The temperature promotion coefficient K(ti) is a contribution coefficient related to a change in the state of the tire member with the temperature ti as a parameter, and is considered to be proportional to, for example, $\exp(\alpha \cdot ti)$ on the basis of a well-known Arrhenius reaction rate formula. In FIG. 4, a is set to 0.069 on the basis of the assumption that the degradation of the tire doubles when the temperature ti rises by 10° C. Furthermore, the temperature ti is the maximum temperature in each temperature interval, but it is not limited thereto, and may be, for example, an average temperature at each temperature interval. The accumulated time is an accumulated time at the temperature interval including the temperature.

Next, the accumulation heat amount estimation unit 40 of the server 30 estimates an accumulation heat amount which can be received by the tire 2 during the predetermined second period (step ST3). In the present embodiment, the accumulation heat amount estimation unit 40 uses the heat history amount of the tire 2 for one month as a reference, and estimates an accumulation heat amount for one year in consideration of a temperature change in each month for one year on the basis of the reference heat history amount.

Specifically, when a heat history amount received by the tire 2 during the first period (for example, one month in October) is set as A10 and an average temperature in October is set as B10 (° C.), a section accumulation heat amount A11 in November can be easily estimated by a mathematical formula such as A11=A10×exp($\alpha$×(B11−B10)) by using an average temperature B11 (° C.) in November. Then, accumulation heat amounts A12 to A10 in the section from December to October of the following year are estimated, respectively, and are added, so that an accumulation heat amount which can be received by the tire 2 in the next year can be estimated.

The average temperature information used for estimation is information indicating a monthly average temperature change as illustrated in FIG. 5, and is acquired by the weather information acquisition unit 34. In this case, as the temperature information, weather information of an area including position information detected by the position information detection unit 15, that is, an area where the vehicle 1 mainly travels during the first period is preferably acquired. According to this configuration, a temperature change with the season in the area where the vehicle 1 mainly travels can be considered, and an accumulation heat amount which can be received by the tire 2 for one year can be accurately estimated.

Furthermore, when estimating the accumulation heat amount, a change in the operating rate of the vehicle 1 with the season is preferably considered. Operating information including the operating rate of the vehicle 1 is acquired by the operating information acquisition unit 36. The operating rate can be calculated as, for example, the ratio of the time during which the engine of the vehicle 1 is operating during a predetermined period (one month). In this case, when the heat history amount received by the tire 2 during the first period (for example, one month in October) is set as A10, the average temperature in October is set as B10 (° C.), and the operating rate in October is set as C10(%), the section accumulation heat amount A11 in November can be easily estimated by a mathematical formula such as $A11=A10 \times \exp(\alpha \times (B11-B10)) \times (C11/C10)$ by using the average temperature B11 (° C.) in November and the average operating rate C11(%) in November of the vehicle 1 in the past. Then, the accumulation heat amounts A12 to A10 in the section from December to October of the following year are estimated, respectively, and are added, so that an accumulation heat amount which can be received by the tire 2 in the next year can be estimated. This makes it possible to accurately estimate an accumulation heat amount which can be received by the tire 2 for one year in consideration of a busy period or a slack period of the vehicle 1.

Furthermore, after the above-described heat history amount in the first period is calculated by dividing it into the in-traveling heat history amount when the vehicle 1 is traveling and the non-in-traveling heat history amount when the vehicle 1 is stopped, it is also possible to calculate a section accumulation heat amount for each month by combining the in-traveling heat history amount and the non-in-traveling heat history amount with the operating rate of each month. Assuming that the operating rate is the ratio of the time during which the engine of vehicle 1 is operating during a predetermined period (one month), the time during which the engine is operating is a traveling period, and the time during which the engine is stopped is a non-traveling period. Thus, it is possible to accurately ascertain a heat history amount (non-in-traveling heat history amount) received by the tire 2 on a holiday when the vehicle 1 is not operated, which makes it possible to more accurately estimate the remaining life period of the casing.

Note that the method for estimating the accumulation heat amount which can be received by the tire 2 during the predetermined second period is not limited thereto, and for example, in a region where an annual temperature fluctuation is small in the everlasting summer or when an annual change in the operating rate of the vehicle 1 is small, it is also possible to estimate an accumulation heat amount for one year (second period) by simply multiplying the heat history amount for one month (first period) by 12.

Next, the casing life prediction unit of the server 30 predicts the remaining life period of the casing from the estimated accumulation heat amount in the second period and the predetermined threshold (step ST4). Specifically, as illustrated in FIG. 6, the casing life prediction unit predicts how long a heat history amount (integrated heat history amount) at the present time (at the time when the process of predicting the remaining life period of the casing of the tire 2 is instructed) will reach a threshold (limit heat amount) by adding the accumulation heat amount for one year (second period) to the heat history amount. In this case, the rate of increase in the accumulation heat amount for one year (second period) may be obtained to predict the period until the threshold is reached; however, in the present embodiment, the remaining life period is preferably predicted by sequentially adding the section accumulation heat amount of each month after November to the current (for example, October) heat history amount. As illustrated in FIG. 6, the accumulation heat amount in the second period does not increase with a uniform slope, and tends to have a small slope in winter and a large slope in summer due to a change in temperature. Accordingly, when adding the accumulation heat amount to the current heat history amount, for example, it is possible to accurately predict the remaining life period of the casing by sequentially adding the section accumulation heat amount divided per month to predict a period until a predetermined threshold is reached. Note that the predetermined threshold may be appropriately set in the relationship between the heat history amount (TTSN) and residual physical properties of parts included in the casing (for example, belt durability, carcass durability, and the like). For example, the belt durability (belt peeling force) is measured as a peeling force [N/inch] when a pair of cross belts are taken out from a used tire and are peeled off from each other. Then, a peeling force that can ensure safety is set as a threshold on the basis of the market performance of a retread tire.

When the remaining life period of the casing is predicted, the server 30 transmits information on the remaining life period to the terminal device 20 and the vehicle terminal 10 together with the tire ID of the tire 2. The terminal device 20 and the vehicle terminal 10 display the received information on the remaining life period on the display units 14 and 23, respectively (step ST5).

As illustrated in FIG. 6, as the display mode for the display units 14 and 23, the remaining life period from the present to the predicted life is preferably visually displayed by a graph or the like. In this case, a plan view of the vehicle 1 and the like are displayed together, and the wheel position is preferably displayed on the basis of the tire ID. According to this configuration, the user (a truck or bus carrier, a driver, a retreader, or a tire seller) can know the remaining life period of the casing of the tire 2 in almost realtime, and recognize which tire 2 is nearing the end of its life.

Furthermore, the operation proposal unit 26 of the terminal device 20 generates an operation plan of the tire 2 on the basis of the remaining life period of the casing received from the server 30 (step ST6). For example, when the remaining groove amount of the tread rubber and the remaining life period of the casing are both sufficient and when the travel distance of the tire 2 has reached a predetermined rotation distance, the operation proposal unit 26 generates an operation plan for rotating the tire 2 and proposes the operation plan to the user. Furthermore, when the remaining life period of the casing is sufficient, but the remaining groove amount of the tread rubber is a predetermined value or less, the operation proposal unit 26 generates an operation plan for acquiring a retread tire by executing a retread that renews the tread rubber, and proposes the operation plan to the user.

Note that the operation plan may be changed as appropriate in addition to the above. When the operation plan of the tire 2 is generated, the process ends.

Now, a casing life management system 100A according to another embodiment will be described. In another embodiment, the casing life management system 100A predicts the remaining casing life of the tire 2 and determines whether the retreading (retread) of the tire 2 is possible. The tire retreading refers to reusing a tire by replacing the tread rubber of a new tire that has reached the end of its primary life with new tread rubber. Thus, the determination as to whether the retreading of the tire is possible is to determine whether the casing used so far can be reused when the tread rubber reaches a primary life.

Figure 7:
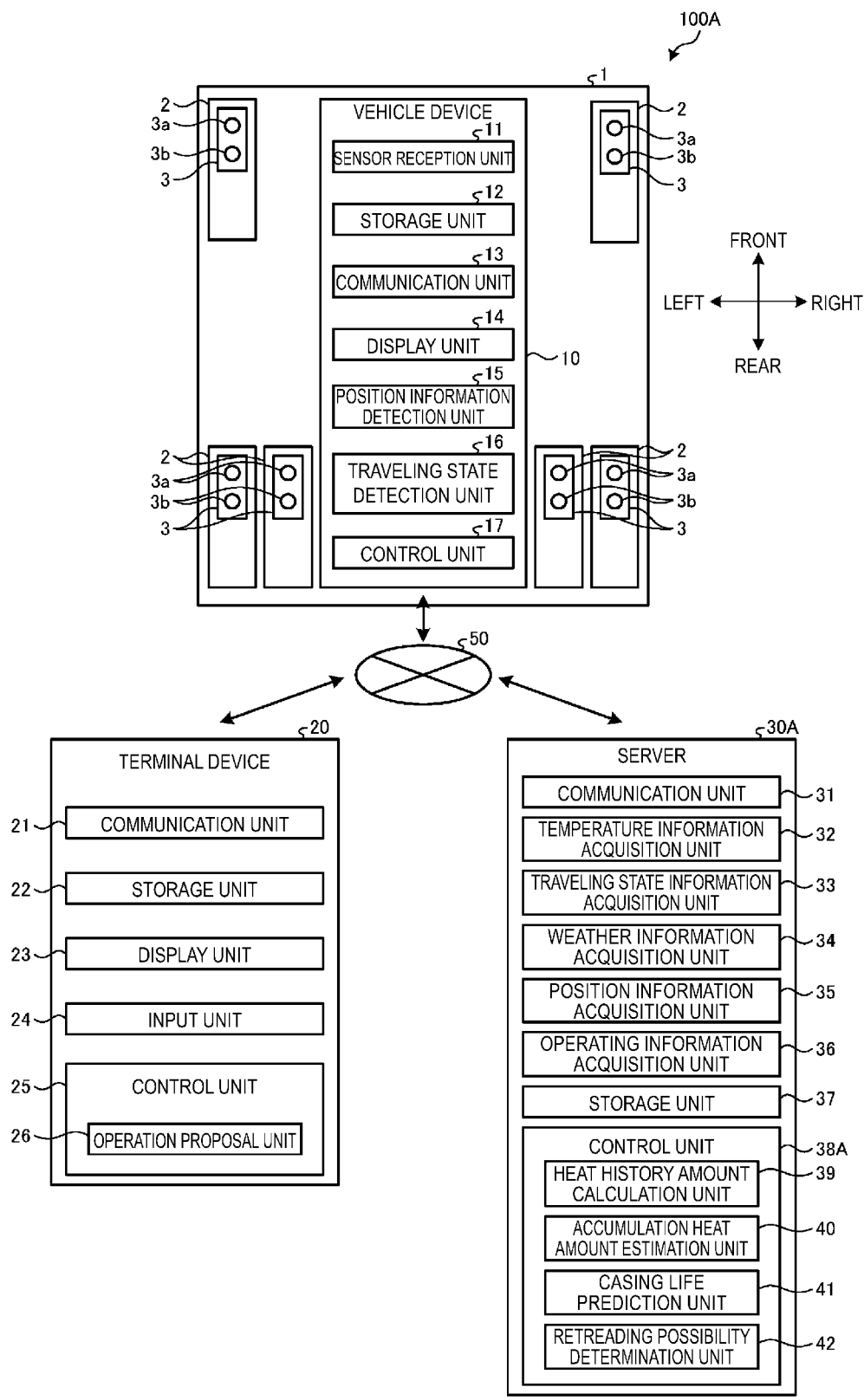
FIG. 7 is a block diagram illustrating an overall configuration of a casing life management system according to another embodiment.
Figure 8:
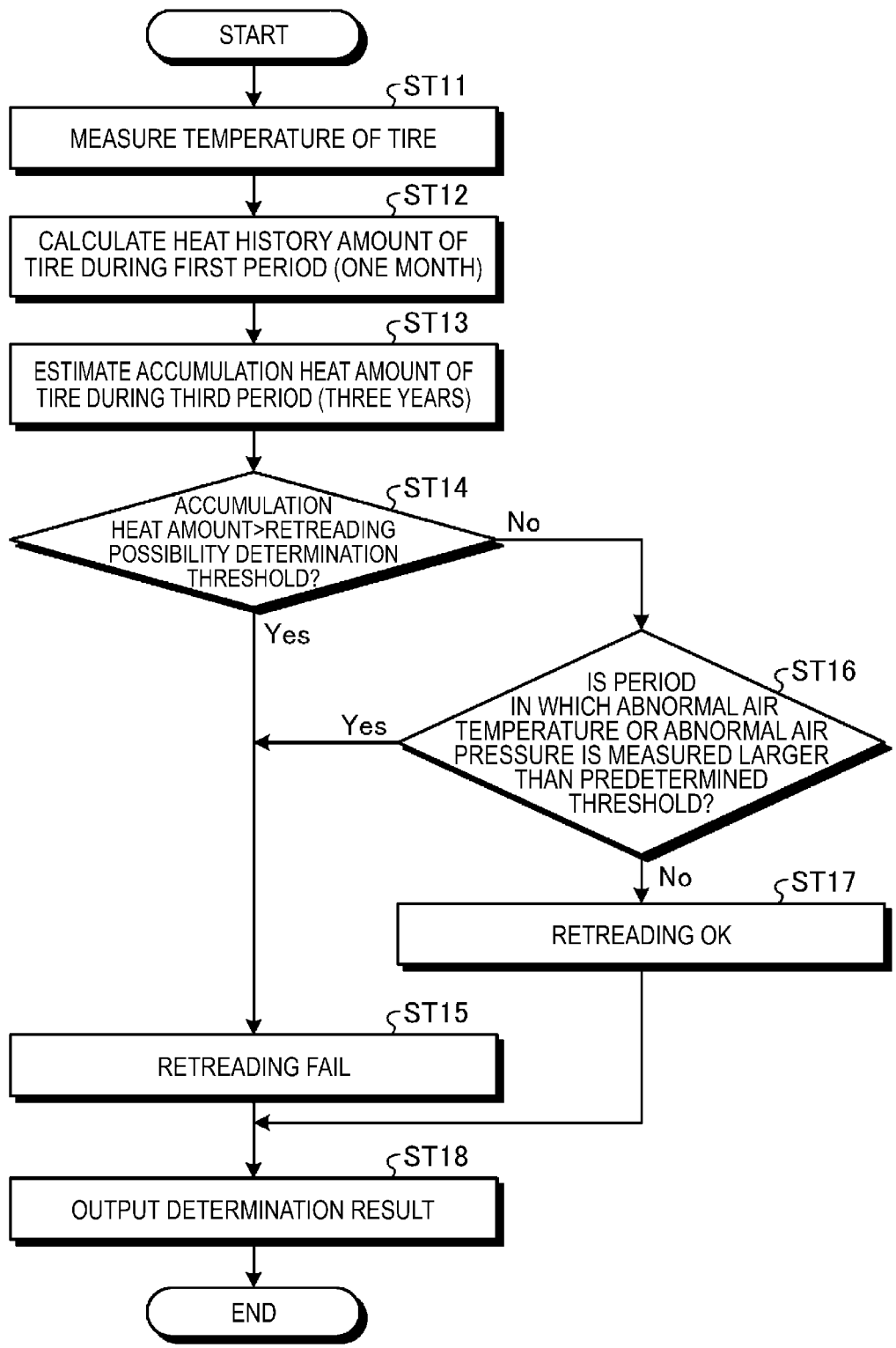
FIG. 8 is a flowchart illustrating an operation procedure of the casing life management system.
Figure 9:
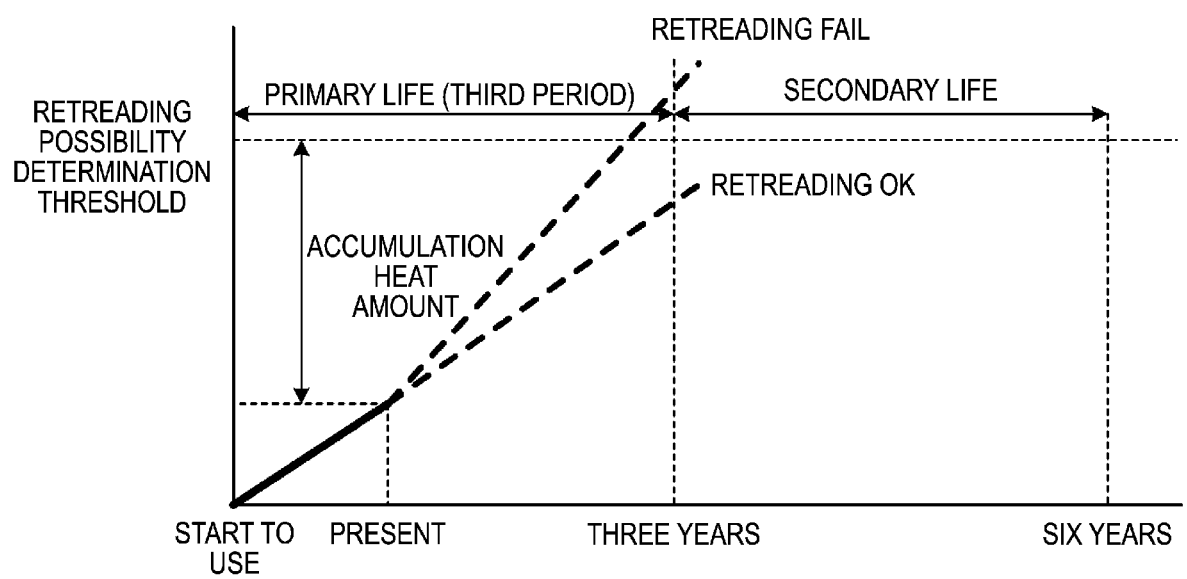
FIG. 9 is a diagram illustrating a relationship between a heat history amount of a tire and possibility of retreading of the tire.

FIG. 7 is a block diagram illustrating an overall configuration of the casing life management system according to another embodiment. FIG. 8 is a flowchart illustrating an operation procedure of the casing life management system. FIG. 9 is a diagram illustrating a relationship between a heat history amount of a tire and possibility of retreading of the tire. In another embodiment, configurations identical to those of the above-described casing life management system 100 are denoted by the same reference numerals, and description thereof will be omitted.

As illustrated in FIG. 7, in the casing life management system 100A, a server 30A includes a control unit 38A, and the control unit 38A has a function of operating as the heat history amount calculation unit 39, the accumulation heat amount estimation unit 40, the casing life prediction unit 41, and a retreading possibility determination unit 42. When a process of predicting the remaining casing life of the tire 2 is instructed, the control unit 38A functions as the heat history amount calculation unit 39, the accumulation heat amount estimation unit 40, and the casing life prediction unit 41 described above, and when a process of determining whether the retreading of the tire 2 is possible is instructed, the control unit 38A functions as the heat history amount calculation unit 39, the accumulation heat amount estimation unit 40, and the retreading possibility determination unit 42 described above. Hereinafter, a function when the process of determining whether the retreading of the tire 2 is possible is instructed will be described.

When the terminal device 20 instructs the process of determining whether the retreading of the tire 2 of the target vehicle 1 is possible, the heat history amount calculation unit 39 reads, from the storage unit 37, a plurality of pieces of temperature information of the tire 2 measured during the predetermined first period (for example, one month), and calculates a heat history amount received by the tire 2 during the first period on the basis of the temperature information. The first period is preferably set to about one month. Furthermore, for example, when the tire is rotated in the vehicle, the heat history amount calculation unit 39 calculates the heat history amount received by the tire 2 during the first period from temperature information of the tire 2 measured during the first period (one month) after the rotation is performed. This makes it possible to accurately calculate the heat history amount in consideration of a temperature difference due to the mounting position of the tire 2 in the vehicle, and to improve the accuracy of determining whether the retreading is possible. Note that, since the method and the like for calculating the heat history amount in the first period are equivalent to those described above, description thereof will be omitted.

The accumulation heat amount estimation unit 40 estimates an accumulation heat amount which can be received by the tire 2 during a predetermined third period, on the basis of the heat history amount in the first period. The third period is a period set as a period indicating the usage limit (primary life) of the tread rubber of the tire 2, and is generally a period in which the remaining groove amount is assumed to be a predetermined value or less due to wear. That is, the third period is a period in which new tires 2 are often retreaded. In the present embodiment, the third period is set to a longer period (for example, three years) than the above-described first period and second period. Note that, since the method and the like for estimating the accumulation heat amount in the third period are equivalent to those described above, description thereof will be omitted, but, for example, the accumulation heat amount for three years can also be easily estimated by multiplying the heat history amount for one month by 36.

The retreading possibility determination unit 42 determines whether the retreading of the tire 2 is possible after the third period (three years). In the present configuration, the retreading possibility determination unit 42 determines whether the retreading of the tire 2 is possible in two cases. In the former case, the retreading possibility determination unit 42 determines whether the retreading of the tire 2 is possible from an estimated accumulation heat amount after three years and a predetermined retreading possibility determination threshold. This determination can be performed, for example, when the first period has elapsed. In the latter case, the retreading possibility determination unit 42 determines whether measured air temperature information and air pressure information are within a prescribed range, and determines whether the retreading of the tire 2 is possible from the time of abnormal air temperature or abnormal air pressure outside of the prescribed range and a predetermined threshold. This determination can be performed periodically before the third period elapses or can be performed at all times by monitoring the air temperature information and the air pressure information.

Next, the operation of the casing life management system will be described. Hereinafter, an operation of the process of determining whether the retreading of the tire 2 is possible will be described. The operation of determining whether the retreading of the tire 2 is possible is performed separately from the above-described operation of estimating the casing life of the tire 2. Detailed description of the operation of determining whether the retreading of the tire 2 is possible, which is equivalent to the above-described procedure of the operation of estimating the casing life of the tire 2, will be omitted. The sensors 3 provided on the tires 2 of the plurality of vehicles 1 measure the temperature inside the tire 2 every predetermined time (for example, 10 minutes) (step ST11). Next, the heat history amount calculation unit 39 calculates the heat history amount of the tire 2 during the predetermined first period (step ST12). Next, the accumulation heat amount estimation unit 40 estimates the accumulation heat amount which can be received by the tire 2 during the predetermined third period (three years) described above (step ST13). In the embodiment, the accumulation heat amount estimation unit 40 uses the heat history amount of the tire 2 for one month described above as a reference, and estimates the accumulation heat amount for three years on the basis of the reference heat history amount. In this case, as described above, the heat history amount of the tire 2 for one month is used as a reference, and the accumulation heat amount for three years is preferably estimated in consideration of a temperature change of each month for one year on the basis of the reference heat history amount.

Next, the retreading possibility determination unit 42 determines whether the estimated accumulation heat amount for three years is larger than the retreading possibility determination threshold (step ST14). The retreading possibility determination threshold is a threshold for determining whether a casing used for three years (primary life) can be reused for three years (secondary life) as a retread tire. Thus, the retreading possibility determination threshold is preferably set to a value of ½ or less of the threshold (limit threshold) used when predicting the remaining life of the casing described above.

In this determination, when the accumulation heat amount after three years is larger than the retreading possibility determination threshold (step ST14; Yes), since degradation (damage) of the casing due to heat is large making it not reusable for three years (secondary life) as illustrated in FIG. 9, the retreading possibility determination unit 42 makes a negative determination (FAIL) that the retreading of the tire 2 is not possible (step ST15).

On the other hand, when the accumulation heat amount after three years is not larger than the retreading possibility determination threshold (step ST14; No), since the degradation (damage) of the casing due to the heat is not so large, the retreading possibility determination unit 42 continuously determines whether the measured air temperature information and air pressure information are within the prescribed range, and determines whether the time of abnormal air temperature or abnormal air pressure outside of the prescribed range is larger than the predetermined threshold (step ST16). In general, in normal use of the tire 2, the air temperature and the air pressure of the tire 2 are within the prescribed range. On the other hand, when the air temperature or the air pressure is outside of the prescribed range due to some external factors, since the casing of the tire 2 is degraded to that amount, the retreading possibility determination unit 42 determines whether the retreading of the tire 2 is possible by using the time outside of the prescribed range as an index.

Specifically, when the measured air temperature is 100° C. or higher, the retreading possibility determination unit 42 determines that the tire 2 is in the state of the abnormal temperature outside of the prescribed range. Furthermore, when the measured air pressure is 70% or less of the standard air pressure of the tire 2, the retreading possibility determination unit 42 determines that the tire 2 is in the state of the abnormal air pressure outside of the prescribed range. The time, during which the tire 2 is in the state of the abnormal temperature or the abnormal air pressure, can be calculated from measurement time information associated with temperature information or air pressure information. In the present embodiment, when the state of the abnormal air temperature is 10 hours or more or the state of the abnormal air pressure is 10 hours or more until the third period (three years) elapses (step ST16; Yes), since the degradation (damage) of the casing is assumed, the retreading possibility determination unit 42 shifts the process to step ST15.

On the other hand, when the state of the abnormal air temperature is less than 10 hours or the state of the abnormal air pressure is less than 10 hours until the third period (three years) elapses (step ST16; No), since the degradation (damage) of the casing is not so large, the retreading possibility determination unit 42 determines that the tire 2 is reusable for three years and makes an affirmative determination (OK) that the retreading of the tire 2 is possible (step ST17). In this configuration, whether the retreading of the tire 2 is possible is determined on the basis of the two stages of the estimated accumulation heat amount after three years and the actually measured air temperature information and air pressure information of the tire 2, and when all determinations are not affirmative, the retreading of the tire is not possible, which makes it possible to accurately make a determination as to the possibility of the retreading.

Finally, the control unit 38A outputs the determination result to at least the terminal device 20 (step ST18). When it is determined whether the retreading of the casing is possible, the control unit 38A transmits information on the determination result to the terminal device 20 together with the tire ID of the tire 2. The terminal device 20 displays the received information on the determination result on the display unit 23. In this case, the plan view of the vehicle 1 and the like are displayed together, and the wheel position is preferably displayed on the basis of the tire ID. According to this configuration, a user (a truck or bus carrier, a retreader, or a tire seller) can accurately know whether the retreading of the casing of the tire 2 is possible, and recognize which tire 2 can be retreaded. Note that of course, the determination result may be output (transmitted) to the vehicle terminal 10. The control unit 38A outputs the determination result and ends the process.

As described above, the casing life management system 100 according to the present embodiment manages the remaining life of the casing disposed on an inner side of tread rubber in the tire radial direction, and includes the temperature sensor 3b that measures the temperature of the tire 2, the heat history amount calculation unit 39 that calculates a heat history amount received by the tire 2 during the first period, on the basis of a plurality of pieces of temperature information of the tire 2 measured during the first period of at least one day, the accumulation heat amount estimation unit 40 that estimates an accumulation heat amount which can be received by the tire 2 during the second period set for one year, on the basis of the heat history amount in the first period, and the casing life prediction unit 41 that predicts the remaining life period of the casing from the accumulation heat amount in the second period and the predetermined threshold. According to the above, the heat history amount actually received by the tire 2 during the first period is used as a reference, the accumulation heat amount which can be received by the tire 2 during the second period set for one year longer than the first period is estimated, and the remaining life period of the casing is predicted from the accumulation heat amount in the second period and the predetermined threshold, which makes it possible to predict the remaining life period of the casing with a simple configuration such as measuring the temperature of the tire 2 during the first period.

Furthermore, according to the present embodiment, the heat history amount calculation unit 39 calculates the heat history amount in the first period by using the temperature promotion coefficient K(ti) related to a change in the state of the tire member given in advance with the temperature ti as a parameter and the accumulated time T(ti) when the plurality of pieces of temperature information measured during the first period are divided into predetermined temperature intervals, which makes it possible to easily calculate the heat history amount in the first period.

Furthermore, according to the present embodiment, since the first period includes the traveling period in which the vehicle 1 mounted with the tire 2 is traveling and the non-traveling period in which the vehicle 1 is stopped, an accumulation heat amount can be estimated in consideration of a heat amount received by the tire 2 in the non-traveling period in which the vehicle 1 is stopped and the remaining life period of the casing can be accurately estimated.

Furthermore, according to the present embodiment, the tire casing life management system 100 includes the traveling state information acquisition unit 33 that acquires the traveling state information of the vehicle 1 mounted with the tire 2, and the heat history amount calculation unit 39 calculates the heat history amount in the first period by dividing the heat history amount into the in-traveling heat history amount when the vehicle 1 is traveling and the non-in-traveling heat history amount when the vehicle 1 is stopped, which makes it possible to accurately calculate the heat history amount in the first period and to accurately estimate the remaining life period of the casing. Moreover, by calculating the non-in-traveling heat history amount when the vehicle 1 is stopped, it is possible to ascertain a heat history amount received by the tire 2 on a holiday when the vehicle 1 is not operated, which makes it possible to more accurately predict the remaining life period of the casing.

Furthermore, according to the present embodiment, the tire casing life management system 100 includes the weather information acquisition unit 34 that acquires past temperature information for a period of one year corresponding to the second period, and the accumulation heat amount estimation unit 40 estimates an accumulation heat amount according to a temperature change for one year, which makes it possible to accurately estimate the accumulation heat amount of the tire 2 of the vehicle 1 traveling in a country or region where the temperature changes with the season, such as Japan. Accordingly, the remaining life period of the casing can be predicted more accurately.

Furthermore, according to the present embodiment, the tire casing life management system 100 includes the position information acquisition unit 35 that acquires the position information of the tire 2 when temperature information is measured or the position information of the vehicle 1 mounted with the tire 2, and the weather information acquisition unit 34 acquires the temperature information of an area including the position information, which makes it possible to consider a temperature change with the season in an area where the vehicle 1 mainly travels. Accordingly, the accumulation heat amount of the tire 2 for one year can be accurately estimated, and the remaining life period of the casing can be predicted more accurately.

Furthermore, according to the present embodiment, the tire casing life management system 100 includes the operating information acquisition unit 36 that acquires the operating information of the vehicle 1 mounted with the tire 2 in one year corresponding to the second period, and the accumulation heat amount estimation unit 40 estimates the accumulation heat amount according to a change in the operating rate for one year, which makes it possible to accurately estimate the accumulation heat amount of the tire 2 for one year in consideration of a busy period or a slack period of the vehicle 1, and to more accurately predict the remaining life period of the casing.

Furthermore, according to the present embodiment, since the predetermined threshold is set to a value indicating the durability of a belt or a carcass included in the casing, a belt separation failure and a carcass separation failure as a tire failure in the market can be prevented.

Furthermore, according to the present embodiment, since the tire casing life management system 100 includes the operation proposal unit 26 that proposes the operation of the tire on the basis of the remaining life period, a user can determine a future operation of the tire by referring to the proposal.

Furthermore, according to the present embodiment, since the tire casing life management system 100 includes the communication unit 31 that transmits the remaining life period to a predetermined user together with the tire ID of the tire 2 and the display units 14 and 23 that display the transmitted information, the user can know the remaining life period of the casing of the tire 2 in almost realtime, and recognize which tire 2 is nearing the end of its life.

Furthermore, according to the present embodiment, the accumulation heat amount estimation unit 40 estimates an accumulation heat amount which can be received by the tire 2 during the predetermined third period set as a usage limit period of the tread rubber, on the basis of the heat history amount in the first period, and the tire casing life management system 100 includes the retreading possibility determination unit 42 that determines whether the retreading of the tire 2 is possible from the accumulation heat amount in the third period and the predetermined retreading possibility determination threshold, which makes it possible to determine whether the retreading of the tire 2 is possible by a simple configuration such as measuring the temperature of the tire 2 during the first period.

Furthermore, according to the present embodiment, the tire casing life management system 100 includes the pneumatic sensor 3a that measures the air pressure of the tire 2, and when the state of abnormal temperature or abnormal air pressure, in which the measured air temperature information or air pressure information is outside of the prescribed range, is a predetermined time or more until the third period elapses, since the retreading possibility determination unit 42 determines that the retreading of the tire is not possible, for example, even though the retreading of the tire is possible in the determination of the estimated accumulation heat amount in the third period and the predetermined retreading possibility determination threshold, the above determination is separately performed on the basis of actually measured air temperature information or air pressure information, which makes it possible to accurately determine whether the retreading of the tire is possible.

While the embodiments of the present technology have been described above, the present technology is not limited to the embodiments described above. For example, in the present embodiment, the tire 2 mounted on the vehicle 1 has been described; however, no such limitation is intended and for example, a tire stored in a warehouse or the like may be used. In this configuration, the above-described vehicle terminal 10 is installed in the warehouse and acquires temperature information of the tire, and the entire heat history amount in the first period is calculated as the non-in-traveling heat history amount. Note that temperature inside the warehouse may be measured every predetermined time and the measured temperature may be used as tire temperature.

Furthermore, in the above embodiments, the time during which the driving source such as an engine is not operating is exemplified as the non-traveling period; however, no such limitation is intended and for example, a case where the engine is operating but the vehicle is temporarily stopped due to waiting for the traffic lights to change may be classified as a non-traveling period.

Furthermore, in the above embodiments, an example of the operation procedure of the casing life management system 100 is illustrated as the tire casing life management method; however, each procedure may be managed by a person.

The invention claimed is:

1. A tire casing life management system for managing a remaining life of a casing disposed on an inner side of tread rubber in a tire radial direction, the tire casing life management system comprising:

a temperature measurement unit that measures a temperature of a tire;
a heat history amount calculation unit that calculates a heat history amount received by the tire during a predetermined first period on the basis of a plurality of pieces of temperature information of the tire measured during the first period;
an accumulation heat amount estimation unit that estimates an accumulation heat amount received by the tire during a predetermined second period longer than the first period, on the basis of the heat history amount in the first period; and
a casing life prediction unit that predicts the remaining life period of the casing from the accumulation heat amount in the second period and a predetermined threshold.

2. The tire casing life management system according to claim 1,
wherein the heat history amount calculation unit calculates the heat history amount by using a promotion coefficient related to a change in a state of a tire member given in advance with a temperature as a parameter and an accumulated time when the plurality of pieces of temperature information measured during the first period are divided into predetermined temperature intervals.

3. The tire casing life management system according to claim 1,
wherein the first period includes a traveling period in which a vehicle mounted with the tire is traveling and a non-traveling period in which the vehicle is stopped.

4. The tire casing life management system according to claim 1, comprising:
a traveling state information acquisition unit that acquires traveling state information of the vehicle mounted with the tire,
wherein the heat history amount calculation unit calculates the heat history amount in the first period by dividing the heat history amount into an in-traveling heat history amount when the vehicle is traveling and a non-in-traveling heat history amount when the vehicle is stopped.

5. The tire casing life management system according to claim 1,
wherein the second period is set to one year or more,
the tire casing life management system comprises a weather information acquisition unit that acquires past temperature information for a period corresponding to the second period, and
the accumulation heat amount estimation unit estimates an accumulation heat amount according to a temperature change during the period.

6. The tire casing life management system according to claim 5, comprising:
a position information acquisition unit that acquires position information of the tire when the temperature information is measured, or position information of the vehicle mounted with the tire,
wherein the weather information acquisition unit acquires the temperature information of an area including the position information.

7. The tire casing life management system according to claim 1, comprising:
an operating information acquisition unit that acquires operating information of the vehicle mounted with the tire during a period corresponding to the second period,
wherein the accumulation heat amount estimation unit estimates the accumulation heat amount according to a change in an operating rate during the period.

8. The tire casing life management system according to claim 1,
wherein the predetermined threshold is set to a value indicating durability of a belt or a carcass included in the casing.

9. The tire casing life management system according to claim 1, comprising:
an operation proposal unit that proposes an operation of the tire on the basis of the remaining life period.

10. The tire casing life management system according to claim 1, comprising:
a transmission unit that transmits the remaining life period to a predetermined user together with identification information of the tire; and
a display unit that displays the transmitted information.

11. The tire casing life management system according to claim 1,
wherein the accumulation heat amount estimation unit estimates an accumulation heat amount received by the tire during a predetermined third period set as a usage limit period of the tread rubber, on the basis of the heat history amount in the first period, and
the tire casing life management system comprises a retreading possibility determination unit that determines whether retreading of the tire is possible from the accumulation heat amount in the third period and a predetermined retreading possibility determination threshold.

12. The tire casing life management system according to claim 11, comprising:
an air pressure measurement unit that measures air pressure of the tire,
wherein when a state of abnormal temperature or abnormal air pressure, in which the measured temperature information or air pressure information is outside of the specified range, is a predetermined time or more until the third period elapses, the retreading possibility determination unit determines that the retreading of the tire is not possible.

13. A tire casing life management method for managing a remaining life of a casing disposed on an inner side of tread rubber in a tire radial direction, the tire casing life management method comprising the steps of:
measuring a temperature of a tire;
calculating a heat history amount received by the tire during a predetermined first period on the basis of a plurality of pieces of temperature information of the tire measured during the first period;
estimating an accumulation heat amount received by the tire during a predetermined second period longer than the first period, on the basis of the heat history amount in the first period; and
predicting the remaining life period of the casing from the accumulation heat amount in the second period and a predetermined threshold.

14. The tire casing life management system according to claim 2,
wherein the first period includes a traveling period in which a vehicle mounted with the tire is traveling and a non-traveling period in which the vehicle is stopped.

15. The tire casing life management system according to claim 14, comprising:

a traveling state information acquisition unit that acquires traveling state information of the vehicle mounted with the tire, wherein the heat history amount calculation unit calculates the heat history amount in the first period by dividing the heat history amount into an in-traveling heat history amount when the vehicle is traveling and a non-in-traveling heat history amount when the vehicle is stopped.

16. The tire casing life management system according to claim 15, wherein the second period is set to one year or more, the tire casing life management system comprises a weather information acquisition unit that acquires past temperature information for a period corresponding to the second period, and the accumulation heat amount estimation unit estimates an accumulation heat amount according to a temperature change during the period.

17. The tire casing life management system according to claim 16, comprising:

a position information acquisition unit that acquires position information of the tire when the temperature information is measured, or position information of the vehicle mounted with the tire, wherein the weather information acquisition unit acquires the temperature information of an area including the position information.

18. The tire casing life management system according to claim 17, comprising:

an operating information acquisition unit that acquires operating information of the vehicle mounted with the tire during a period corresponding to the second period, wherein the accumulation heat amount estimation unit estimates the accumulation heat amount according to a change in an operating rate during the period.

19. The tire casing life management system according to claim 18, wherein the predetermined threshold is set to a value indicating durability of a belt or a carcass included in the casing.

20. The tire casing life management system according to claim 19, comprising:

an operation proposal unit that proposes an operation of the tire on the basis of the remaining life period.

* * * * *